(12) United States Patent
Oury

(10) Patent No.: US 10,955,089 B2
(45) Date of Patent: Mar. 23, 2021

(54) SET FOR DISPENSING LIQUEFIED GAS

(71) Applicant: CRYOSTAR SAS, Hesingue (FR)

(72) Inventor: Simon Oury, Saint-Louis (FR)

(73) Assignee: CRYOSTAR SAS, Hesingue (FR)

( * ) Notice: Subject to any disclaimer, the term of this patent is extended or adjusted under 35 U.S.C. 154(b) by 235 days.

(21) Appl. No.: 16/073,616

(22) PCT Filed: Jan. 9, 2017

(86) PCT No.: PCT/EP2017/050353
§ 371 (c)(1),
(2) Date: Jul. 27, 2018

(87) PCT Pub. No.: WO2017/129389
PCT Pub. Date: Aug. 3, 2017

(65) Prior Publication Data
US 2019/0078737 A1 Mar. 14, 2019

(30) Foreign Application Priority Data

Jan. 29, 2016 (EP) .................................... 16305092

(51) Int. Cl.
F17C 9/00 (2006.01)
F17C 6/00 (2006.01)

(52) U.S. Cl.
CPC .................. F17C 9/00 (2013.01); F17C 6/00 (2013.01); F17C 2201/0109 (2013.01); F17C 2201/035 (2013.01); F17C 2201/054 (2013.01); F17C 2205/0332 (2013.01); F17C 2221/011 (2013.01); F17C 2221/012 (2013.01); F17C 2221/014 (2013.01); F17C 2221/017 (2013.01); F17C 2221/033 (2013.01); F17C 2221/035 (2013.01); F17C 2223/0153 (2013.01);
(Continued)

(58) Field of Classification Search
CPC .......... F17C 9/02; F17C 9/04; F17C 2265/01; F04B 15/08
See application file for complete search history.

(56) References Cited

U.S. PATENT DOCUMENTS 4,753,571 A 6/1988 Schill et al.
5,865,605 A 2/1999 Weidlein
(Continued)

FOREIGN PATENT DOCUMENTS

EP 0222233 A2 5/1987
EP 1018601 A2 7/2000
(Continued)

OTHER PUBLICATIONS

International Search Report for PCT/EP2017/050353 dated Mar. 22, 2017.

Primary Examiner — Brian M King
(74) Attorney, Agent, or Firm — Millen White Zelano & Branigan, PC; Brion P. Heaney

(57) ABSTRACT

A set (10) for dispensing liquefied gas from a vessel (100) comprises a supporting structure (1), a pump (2) and a conditioning system (4). The supporting structure is designed for maintaining both the pump and the conditioning system inside the vessel when the set is in operation condition for dispensing a flow of liquefied gas. The set allows easy handling, simple fitting to the vessel and easy removal from the vessel because a main part of said set can be handled as a one-block element.

21 Claims, 3 Drawing Sheets

(52) U.S. Cl.
CPC .......... *F17C 2223/0161* (2013.01); *F17C 2223/033* (2013.01); *F17C 2223/043* (2013.01); *F17C 2223/047* (2013.01); *F17C 2225/0153* (2013.01); *F17C 2225/0161* (2013.01); *F17C 2225/033* (2013.01); *F17C 2225/035* (2013.01); *F17C 2227/015* (2013.01); *F17C 2227/0178* (2013.01); *F17C 2227/0304* (2013.01); *F17C 2227/039* (2013.01); *F17C 2227/0309* (2013.01); *F17C 2227/0341* (2013.01); *F17C 2227/0379* (2013.01); *F17C 2250/032* (2013.01); *F17C 2250/043* (2013.01); *F17C 2250/0439* (2013.01); *F17C 2250/0443* (2013.01); *F17C 2250/0491* (2013.01); *F17C 2250/0626* (2013.01); *F17C 2250/0631* (2013.01); *F17C 2250/0636* (2013.01); *F17C 2260/035* (2013.01); *F17C 2265/061* (2013.01); *F17C 2265/065* (2013.01); *F17C 2265/066* (2013.01); *F17C 2270/0105* (2013.01); *F17C 2270/0139* (2013.01); *F17C 2270/0168* (2013.01); *F17C 2270/0171* (2013.01); *F17C 2270/0173* (2013.01); *F17C 2270/0194* (2013.01); *F17C 2270/0197* (2013.01); *Y02E 60/32* (2013.01)

(56) References Cited

U.S. PATENT DOCUMENTS

| | | |
|---|---|---|
| 6,203,288 B1 | 3/2001 | Kottke |
| 6,283,720 B1 | 9/2001 | Kottke |
| 6,506,030 B1 | 1/2003 | Kottke |
| 9,551,330 B2 | 1/2017 | Drube |
| 2008/0156382 A1* | 7/2008 | Cho .............. F04B 15/08 137/565.01 |
| 2014/0109599 A1* | 4/2014 | Lefevre .......... F04B 37/06 62/50.6 |
| 2015/0143821 A1 | 5/2015 | Johnson et al. |
| 2015/0144203 A1 | 5/2015 | Drube |
| 2015/0184645 A1 | 7/2015 | Johnson et al. |
| 2015/0276130 A1 | 10/2015 | Hall |
| 2016/0281697 A1* | 9/2016 | Coldren .......... F04B 15/08 |
| 2017/0037836 A1* | 2/2017 | Brown .......... F04B 23/021 |

FOREIGN PATENT DOCUMENTS

| | | |
|---|---|---|
| GB | 1016555 A | 1/1966 |
| WO | 2015077784 A1 | 5/2015 |

* cited by examiner

SET FOR DISPENSING LIQUEFIED GAS

The present invention relates to a set for dispensing a flow of liquefied gas from a vessel containing the gas in liquid phase.

BACKGROUND OF THE INVENTION

Sets for dispensing liquefied gas from a storage vessel usually comprise a pump and a liquefied gas conditioning system. In such known sets, the pump may be designed to be submerged in the liquefied gas within the vessel, and the conditioning system is arranged outside the vessel, between the vessel and a dispenser of the liquefied gas. Thus, known sets for dispensing a flow of liquefied gas from a vessel which contains the gas in liquid phase each comprise:

- a supporting structure, which connects a suction end and a discharge end, and which is adapted for being fitted tightly to the vessel so that the suction end is submerged in the liquefied gas within the vessel while the discharge end is situated at an external surface of the vessel;
- a pump to be maintained by the supporting structure so as to be submerged in the liquefied gas when the set is in operation condition for dispensing the liquefied gas flow, and which is adapted for driving the flow of liquefied gas from the suction end toward the discharge end;
- a removable sealing assembly which is located at the discharge end of the supporting structure, and which is adapted for sealing an aperture through a wall of the vessel when the set is in operation condition, and the sealing assembly is provided with a liquid outlet arranged for discharging the liquefied gas flow driven by the pump; and
- a conditioning system adapted for cooling or warming up at least one quantity of the liquefied gas.

The supporting structure and the sealing assembly are designed so that the pump can be moved by an operator within the vessel by means of the supporting structure, in particular when the pump is to be extracted from or introduced into the vessel.

The conditioning system is usually adapted for cooling or warming up the liquefied gas flow which is dispensed from the vessel to any user equipment. Such conditioning system is located outside the vessel under the operation condition of the liquefied gas dispensing set. Then, such set has the following drawbacks:

- the arrangement of the conditioning system requires that enough space is available outside the vessel;
- heat leakage paths possibly existing at the conditioning system out of the vessel may produce vaporization of part of the gas flow currently dispensed, before it is transferred to the user device;
- extracting the pump from the vessel, in particular for repairing or maintenance of this pump, requires separating the sealing assembly from the conditioning system before the sealing assembly is removed and the pump is extracted from the vessel, which may be complicated or hazardous depending on the gas which is dispensed; and
- the pump and the conditioning system are to be handled separately from each other after dismounting of the set, in particular for repairing or maintenance of these elements.

Then, an object of the present invention is to alleviate at least one of these drawbacks.

In particular, an object of the invention is to facilitate the repairing or maintenance of the whole set, by reducing the step number in the dismounting sequence at the vessel location.

Another object of the invention is to provide a complete set for dispensing liquefied gas from a vessel, which is easy to install at the vessel for the first time, and which allows thereafter easy and rapid removal of the pump and the conditioning system from the gas vessel.

SUMMARY OF THE INVENTION

For meeting at least one of these objects or others, a first aspect of the present invention proposes a set for dispensing a flow of liquefied gas from a vessel as described before, but in which the conditioning system and the supporting structure are adapted so that the conditioning system is maintained within the vessel by the supporting structure in addition to the pump, between the suction end and the discharge end when the set is in operation condition. In addition, the supporting structure is further adapted so that the conditioning system can also be moved by the operator within the vessel by means of the supporting structure when the conditioning system is to be extracted from or introduced into the vessel.

Hence, a main part of the set, including the pump, the conditioning system and the supporting structure, can be removed from the vessel for being transferred to a repair and maintenance shop, without dismounting step implemented for separating any of these components from each other. Thus, this set part can be delivered as a single block to the location of the vessel, and its mounting onto the vessel is easy and rapid to implement. In some invention implementations, the sealing assembly and also further components of the set may advantageously also belong to the one-block element part of the set.

Additionally, heat leakage paths which possibly exist at the conditioning system have less or non consequence since the conditioning system is located within the vessel under the operation condition.

Generally for the invention, the conditioning system may be suitable for cooling or warming up the flow of liquefied gas which is driven by the pump, on-the-fly during travelling of this flow of liquefied gas from the suction end to the discharge end when the set is in operation condition. Alternatively, the conditioning system may also be suitable for cooling or warming up the gas in liquid phase which is contained in the vessel. Such latter function of the conditioning system is called "bulk warming or cooling" by the Man skilled in liquefied gas handling. Also possibly, the conditioning system may have both functions of adjusting on-the-fly the temperature of the liquefied gas to be dispensed, and producing a bulk warming or cooling of the liquefied gas contained in the vessel.

In possible implementations of the invention, the set may be arranged so that, when it is in operation condition, the discharge end of the supporting structure is located higher than the suction end along vertical direction, and the supporting structure is further adapted for maintaining the conditioning system higher than the pump along the vertical direction.

In preferred embodiments of the invention, the set may further comprise a peripheral wall which extends from the suction end to the discharge end, and surrounds both the pump and the conditioning system when the set is in operation condition. Possibly, the supporting structure may be designed to be inserted into a volume internal to the peripheral wall upon introducing the pump and the conditioning system into the vessel for gas dispensing operation, or removed from the volume internal to the peripheral wall upon extracting the pump and the conditioning system from the vessel. Alternatively, the peripheral wall may be part of the supporting structure which maintains both the pump and the conditioning system.

For such preferred invention embodiments with peripheral wall, the set may further comprise a pipe to be arranged within the volume internal to the peripheral wall for conducting the liquefied gas flow from the pump to the liquid outlet. Then, a height of the supporting structure may be suitable so that a gas volume exists below the sealing assembly but outside the pipe, and surrounded by the peripheral wall, when the set is in operation condition. Such gas volume helps in reducing boil-off gas which may be caused by thermal insulation defects which may exist at the sealing assembly. In various embodiments, the height of the supporting structure may be suitable so that the gas volume extends over more than 0.20 meter, and preferably less than 50 meters, in particular less than 1 meter, along the vertical direction and when the set is in operation condition.

Again when a peripheral wall is implemented, the set may advantageously further comprise a suction valve which is fitted tightly to the peripheral wall at the suction end of the supporting structure. Such suction valve may be adapted for being in open state when the set is in operation condition, so that the liquefied gas flow is admitted into the volume internal to the peripheral wall through the suction valve, and the suction valve may also be adapted for being in closed state when the pump is not located with respect to the peripheral wall at a position which corresponds to the set being in operation condition. Even more advantageously, the suction valve may be arranged so as to be driven into its open state by the pump being moved along the peripheral wall to the suction end, and into its closed state by the pump being moved along the peripheral wall away from the suction end, in particular upon the pump being introduced into or extracted from the vessel, respectively.

Optionally, the following additional features may also be implemented with the invention and the optional above improvements, separately or in combination of several of them:

- the set may be further adapted for the vessel having a shape with largest dimension along a horizontal direction, or the vertical direction, or an oblique direction which is slanted between a horizontal direction and the vertical direction;
- the set may be further adapted for the vessel being underground;
- the set may be further adapted for the vessel being a liquefied gas storage tank, or a sump container external to a liquefied gas storage tank and connected to be fed with liquefied gas from this latter;
- the set may further comprise at least one gas handling component which is selected among an outlet valve connected to the liquid outlet for allowing, limiting or blocking the liquefied gas flow to be dispensed by the set, a check-valve connected to the liquid outlet, a flow-meter for measuring a debit of the liquefied gas flow dispensed by the set, at least one temperature sensor for measuring a temperature of at least one among the gas in liquid phase contained within the vessel and the liquefied gas flow dispensed by the set, at least one pressure sensor for measuring a pressure of at least one among the gas in liquid phase contained within the vessel and the liquefied gas flow dispensed by the set, a heat exchanger, in particular included within a vaporizer or a condenser, and a release valve arranged for discharging gas from inside of at least one among the set and the vessel. Then such gas handling component may be arranged at the discharge end of the supporting structure or affixed to the sealing assembly when the set is in operation condition;
- the set may further comprise electrical power supply means and control means arranged at the discharge end of the supporting structure or at the sealing assembly. These means may be adapted for supplying electrical power to the pump and conditioning system when both the pump and conditioning system are maintained by the supporting structure and the set is in operation condition. They may also be adapted for controlling start and stop of the liquefied gas flow, and for adjusting a temperature and/or a pressure of this liquefied gas flow and/or of the gas in liquid phase contained within the vessel, and possibly also for controlling a debit of the liquefied gas flow. Such control means and electrical supply means may comprise at least one among control inputting means and a control display;

Generally, the invention set may be suitable for dispensing liquefied gas selected among liquefied methane, ethane, propane, butane and blends thereof, including natural gas and petroleum gas, in particular gas comprised of more than 80% in-weight of methane, or selected among liquefied helium, oxygen, nitrogen, ammonia, and space rocket or spacecraft propulsion liquid fuel.

A second aspect of the invention proposes a liquefied gas refueling station, which comprises a liquefied gas dispenser, a vessel for containing the gas in liquid phase, and a set in accordance with the first invention aspect, where the liquefied gas dispenser is connected to the liquid outlet of the set. Such station may be adapted so that the liquefied gas is a motor fuel gas. In particular, the station may be adapted for refueling road vehicles, in particular trucks, with motor fuel gas. Alternatively, the station may be dedicated for feeding a motor such as a ship propelling motor or a locomotive motor with liquefied fuel gas, and may be arranged on-board the ship or locomotive.

These and other features of the invention will be now described with reference to the appended figures, which relate to preferred but not-limiting embodiments of the invention.

BRIEF DESCRIPTION OF THE DRAWINGS

Same reference numbers which are indicated in different ones of these figures denote identical elements of elements with identical function.

For clarity sake, elements represented in these figures are not reproduced with dimensions or dimension ratios which match actual embodiments.

DETAILED DESCRIPTION OF THE INVENTION

The invention is now described in detail for several installation and embodiment examples, but without inducing any limitation with respect to the claim scope. In particular, application to a refueling station dedicated to road vehicles, for example trucks, is described, but other applications are encompassed as well by the claims, with identical implementation features or gas-adapted and/or application-adapted implementation features.

Figure 1A:
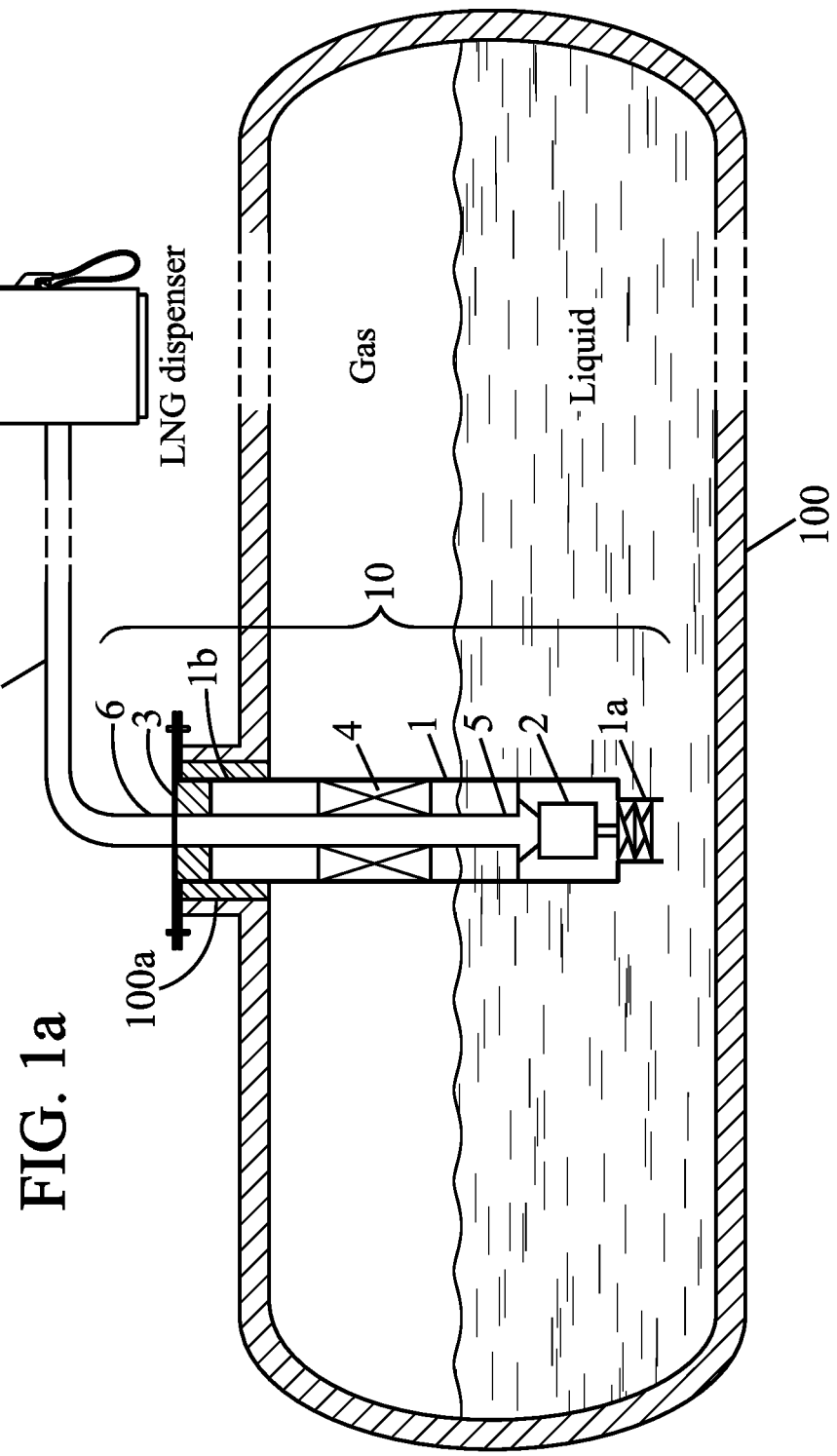
FIGS. 1a and 1b illustrate two possible installations for a set in accordance with the invention.
Figure 1B:
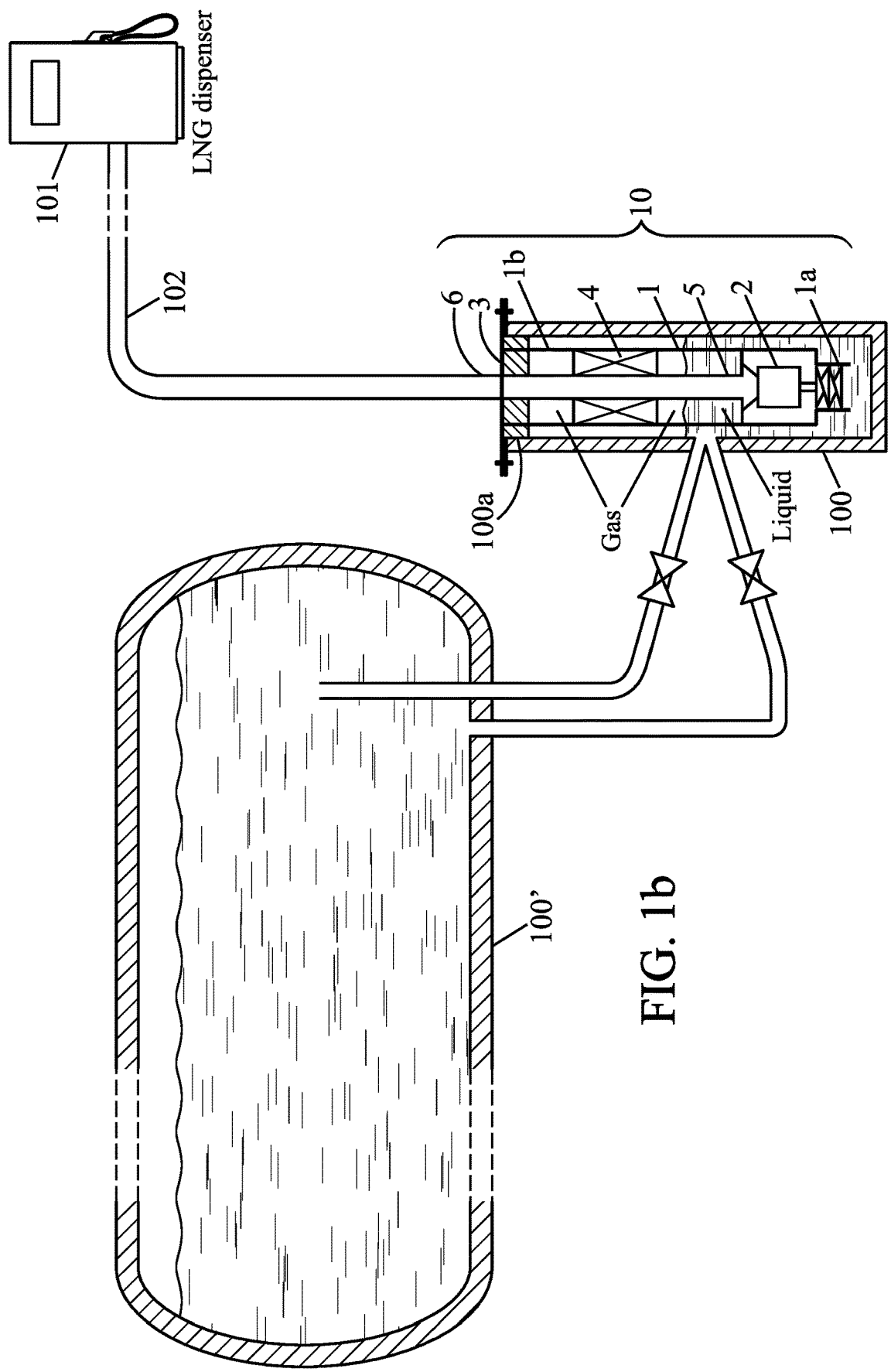

In FIGS. 1a and 1b, the following reference numbers have the meanings now listed:

100 vessel containing liquefied motor fuel gas
100a aperture in a wall of the vessel 100
100' storage tank
101 liquefied gas dispenser
102 duct for supplying the dispenser 101 with liquefied gas
10 set for dispensing the liquefied motor fuel gas, installed in the vessel 100
1 supporting structure
1a suction end of the supporting structure 1
1b discharge end of the supporting structure 1
2 pump
3 removable sealing assembly
4 conditioning system
5 pipe, optional
6 liquid outlet of the set 10, provided on the removable sealing assembly 3

The vessel 100 may be a storage tank which is designed for containing a large amount of liquefied motor fuel gas as represented in FIG. 1a, or a sump container as represented in FIG. 1b. When it is a sump container, it is connected to the storage tank 100' with suitable ducts for transferring liquefied motor fuel gas from the storage tank 100' to the sump container, and also possibly for some liquefied gas to flow back from the sump container to the storage tank 100', for example for maintenance operations in the sump container.

The vessel 100 is provided with appropriate thermally isolated walls for maintaining the contained liquefied motor fuel gas at a temperature which is suitable for the liquid phase, and for reducing boil-off gas which may be caused by possibly existing thermal insulation defects. The vessel 100 may have any shape and general orientation, and also may be underground or buried, depending on installation constraints.

The duct 102 is connected to the liquid outlet 6 of the set 10, for discharging toward the dispenser 101 the flow of liquefied gas which is driven by the pump 2. Within the set 10, the pipe 5 may connect the output of the pump 2 to the liquid outlet 6. However, the pipe 5 may be unnecessary if the supporting structure 1 is designed so as to enclose hermetically an internal volume which is separated from the remaining volume of the vessel 100, between the suction end 1a and the discharge end 1b. But in other embodiments of the invention, the supporting structure 1 may be openwork, for example comprised of several posts which are arranged from the suction end 1a to the discharge end 1b, and possibly distributed angularly around a central axis of the set 10.

The supporting structure 1 is designed for supporting both the pump 2 and the conditioning system 4 inside the vessel 100. Any practical means may be used for affixing the pump 2 to the supporting structure 1, and also for affixing the conditioning system 4 to the supporting structure 1. In operation condition for dispensing the flow of liquefied motor fuel gas, the suction end 1a of the supporting structure 1 is submerged in the liquefied gas contained within the vessel 100, and the discharge end 1b is situated substantially at the vessel opening 100a. Because the supporting structure 1 extends to the discharge end 1b, it is possible for an operator to catch it from the outside of the vessel 100, and extract it out of the vessel 100 together with the pump 2 and the conditioning system 4, as a one-block element through the aperture 100a of the vessel 100.

Preferably, the conditioning system 4 is affixed to the supporting structure 1 between the pump 2 and the discharge end 1b, in operation condition of the set 10. In preferred embodiments of the invention, the supporting structure 1 is oriented vertically in the operation condition within the vessel 100, so that the supporting structure 1 maintains the conditioning system 4 above the pump 2.

The removable sealing assembly 3 is designed for hermetically sealing the aperture 100a of the vessel 100 in the operating condition of the set 10. It is removed for extracting the supporting structure 1 together with the pump 2 and the conditioning system 4 from the vessel 100, of for introducing them into the vessel 100. The removable sealing assembly 3 may also be provided with thermally insulating means for avoiding or reducing heat penetration into the vessel 100 through the removable sealing assembly 3, or at the interface between the vessel wall and the removable sealing assembly 3 about the aperture 100a.

In some embodiments, the supporting structure 1 may be affixed onto the removable sealing assembly 3, for example onto a downward-facing surface of this latter in operation condition. In other embodiments, the supporting structure 1 may be separate from the removable sealing assembly 3, and supported by the vessel wall close to the aperture 100a. Possibly, a dedicated ring of the supporting structure 1 at the discharge end 1b may be designed for being pinched between the removable sealing assembly 3 and an annular seat which is provided on the vessel 100 about the aperture 100a.

The pump 2 may be of any type suitable for driving a flow of the liquefied motor fuel gas from the suction end 1a toward the liquid outlet 6, depending on the desired range for the debit value of this flow. Preferably, the pump 2 may be of immersion type, so that is it completely penetrated by the liquefied gas when in pumping condition.

The conditioning system 4 is adapted for cooling and/or warming up the liquefied gas. One additional advantage of arranging the conditioning system 4 inside the vessel 100 in accordance with the invention, is to simplify the conditioning system 4 itself, in particular its components which produce the thermal transfer between the liquefied gas and the thermally active parts of the conditioning system 4. It also reduces drastically any thermally conducting path from outside of the vessel 100 to the conditioning system 4, thereby participating in reducing unwanted vaporization of the liquefied gas before it is delivered by the dispenser 101.

According to a first implementation of the conditioning system 4, it may be arranged for cooling or warming up on-the-fly the flow of liquefied motor fuel gas which is supplied by the set 10 to the dispenser 101. For example, it may be arranged around the pipe 5 when such pipe is used, or it may be submerged within the flow of dispensed liquefied gas before this flow reaches the liquid outlet 6.

According to a second implementation of the conditioning system 4, it may be arranged for cooling or warming up the liquefied gas contained in the vessel 100 outside the set 10. Such operation is commonly called bulk conditioning, and implemented in particular for adjusting the pressure within the vessel 100.

Also possibly, the conditioning system 4 may have both functions of bulk conditioning and cooling or warming up on-the-fly the flow of liquefied gas which is dispensed. To this end, it is preferably arranged in the set 10 so as to be selectively in thermal communication with either or both the flow of liquefied gas to be dispensed and the liquefied gas outside the set 10 within the vessel 100. Both functions may be controlled alternatively or simultaneously using appropriate selection means.

Figure 2:
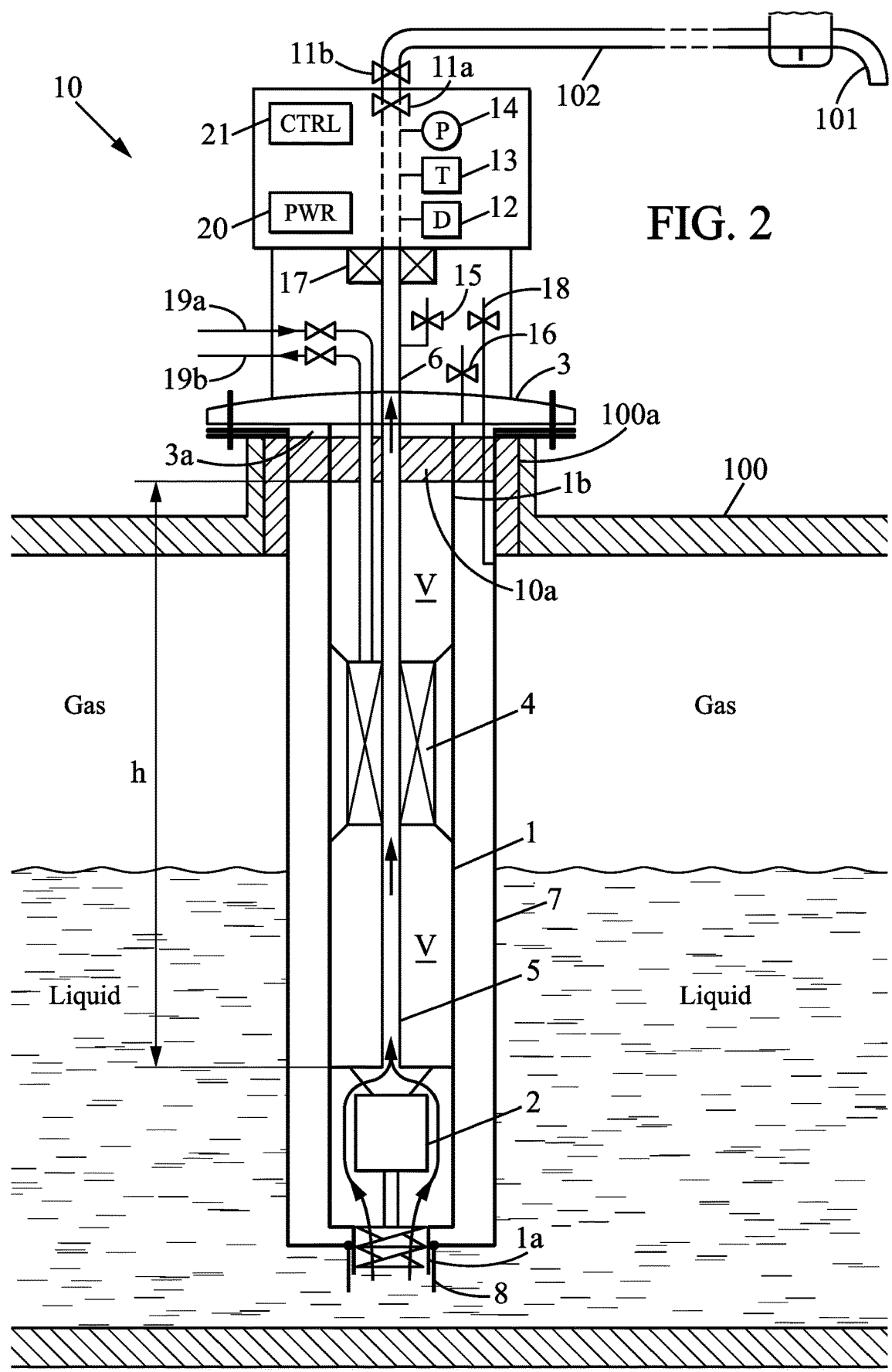
FIG. 2 illustrates a preferred embodiment of the invention.

The preferred embodiment of the invention shown in FIG. 2 implements two additional components belonging to the set 10: a peripheral wall 7 and a suction valve 8. The peripheral wall 7 may possibly be implemented without the suction valve 8. It separates a volume V internal to the set 10 from the remaining internal volume of the vessel 100, so that no liquefied gas can enter into the volume V without being admitted through the suction valve 8. Then the supporting structure 1, the pump 2 and the conditioning system 4 are arranged within the peripheral wall 7, both latter components being maintained by the supporting structure 1. The supporting structure 1 may be again comprised of one or several posts to which both the pump 2 and the conditioning system 4 are affixed. An advantage of such peripheral wall 7 is to allow a gas amount to exist within the volume V below the removable sealing assembly 3, for further reducing heat transfer from outside of the vessel 100 to the liquefied gas contained inside. The peripheral wall 7 may be implemented together with the pipe 5, for combining a path for the flow of liquefied gas to be dispensed with the permanent retention of the gas amount within the volume V internal to the set 10. A height h of the gas volume thus retained below the removable sealing assembly 3 may vary depending on the application of the invention. For the application to a refueling station for road vehicles, the height h may be comprised between 0.20 m (meter) and 1 m along vertical direction, but for other applications such as mass storage of liquefied gas, for example in port facilities, the height h may be up to 50 m.

Generally for a set 10 according to the invention, or in combination with a gas amount retained below the removable sealing assembly 3 in the volume V internal to the set 10 as just described, a thermal insulation element 10a may be provided additionally close to the downward-facing surface of the removable sealing assembly 3.

The suction valve 8 may be fitted to the lower end of the peripheral wall 7. It may be advantageously designed so as to switch automatically to closed state when the pump 2 is not maintained by the supporting structure 1 in a position which corresponds to the operation condition of the set 10. Thus, the suction valve 8 seals the lower end of the peripheral wall 7 once the pump 2 is raised within the peripheral wall 7 by means of the supporting structure 1. Also the suction valve 8 may be switched to open state by the lowering of the pump 2 until its position for operation of the set 10, while controlling the moving of the pump 2 by means of the supporting structure 1. Such suction valve 8 allows removing the supporting structure 1 together with the pump 2 and the conditioning system 4 from the vessel 100 without a large quantity of liquefied gas being vaporized and escaping through the aperture 100a. Other types of switchable suction valve may be used alternatively, for example suction valves which may be controlled into open state and closed state from outside of the vessel 100 independently from the position of the pump 2 within the peripheral wall 7. Before extracting the supporting structure 1 together with the pump 2 and the conditioning system 4 from the vessel 100, pressurized inert gas may be injected from outside into the peripheral wall 7, for example by means of a dedicated gas injection line (not represented) arranged through the removable sealing assembly 3. The liquefied gas is thus pushed downwards within the peripheral wall 7, back into the vessel 100 outside the peripheral wall 7 of the set 10. Then the suction valve 8 is closed, the removable sealing assembly 3 can be removed, and the supporting structure 1 together with the pump 2 and the conditioning system 4 can be extracted from inside of the peripheral wall 7 as a one-block element through the aperture 100a. The peripheral wall 7 and the closed suction valve 8 remain tightly fixed in place within the vessel 100 as the supporting structure with the pump 2 and the conditioning system 4 are away. The suction valve 8 is still closed upon re-introducing the supporting structure 1 together with the pump 2 and the conditioning system 4 as a one-block element again, into the vessel 100 through the aperture 100a. Once the assembly of the supporting structure 1 with the pump 2 and conditioning system 4 have been brought into final position for operation of the set 10, the removable sealing assembly 3 is mounted so as to seal the aperture 100a, air is replaced with inert gas within the volume V internal to the peripheral wall 7, the suction valve 8 is driven into open state and the inert gas is allowed to escape from inside of the peripheral wall 7, possibly through a dedicated gas line (not represented) through the removable sealing assembly 3. After removal of the air, a gas amount originating from the liquid, or boil-off gas, may be left permanently inside the peripheral wall 7 as explained before, for thermal insulation improvement.

A main advantage of a set according to the invention results from the possible handling of the main components of the set, including the pump 2 and the conditioning system 4, as one block. In this way, delivery of the set at the location of the vessel 100 is made easier in a large extent, as well as the fitting of the set onto the vessel 100, its removal from the vessel 100 and its transfer to a workshop for maintenance service. Indeed, the whole set is assembled before delivery or at the service workshop, away from the refueling station. Hence, using of the set 10 and also more generally running of the refueling station are made easier.

For increasing further this advantage of one-block handling, additional components may be affixed to the supporting structure 1, at the discharge end 1b, or to the removable sealing assembly 3. Such additional elements may relate to gas handling components, and electrical supply and control means.

Such gas handling components may be selected among the following ones, without limitation:

- an outlet valve 11a which is intermediate between the liquid outlet 6 and the duct 102, for allowing, limiting or blocking the liquefied gas flow to be dispensed by the set 10;
- a check-valve 11b which also is intermediate between the liquid outlet 6 and the duct 102, for avoiding that liquefied gas may be sucked back into the vessel 100;
- a flow-meter 12 for measuring the debit of the liquefied gas flow which is dispensed by the set 10;
- one or several temperature sensors 13 for measuring the temperature of the liquefied gas flow which is dispensed by the set 10, and possibly also for measuring additionally the temperature of the liquefied gas which is contained within the vessel 100 outside the set 10;
- one of several pressure sensors 14 for measuring a pressure of the liquefied gas flow which is dispensed by the set 10, for example the pressure at the liquid outlet 6, and possibly also for measuring additionally a pressure of the liquefied gas which is contained within the vessel 100 outside the set 10;
- optionally, a controller (not represented) for controlling an operation of the conditioning system 4, for bulk-warming or bulk-cooling of the liquefied gas which is contained within the vessel 100, so as to maintain a desired pressure value inside the vessel 100;

a heat exchanger 17 used for the conditioning system 4 or other functionalities. In some embodiments of the invention, such heat exchanger may be part of a vaporizer or condenser arranged in a well-known manner;

a release valve 16 arranged for discharging gas from inside of the set 10, and/or another release valve 18 arranged for discharging gas from inside the vessel 100, for avoiding that excessive pressure values happen in the set 10 or the vessel 100, respectively or both; and optionally, a heat carrier fluid circuit, with supply duct 19a and return duct 19b, for supplying a flow of heat or cold carrier fluid to the conditioning system 4.

Also, the electrical supply and control means may be selected among the following ones:

electrical power supply means 20, for supplying power to the pump 2 and the conditioning system 4. These electrical power supply means 20 may have various structures, in particular with components which are shared by the pump 2 and the conditioning system 4, or only with components which are dedicated either to the pump 2 or to the conditioning system 4. In particular, these electrical power supply means 20 control start and stop of the flow of liquefied gas to be dispersed, by controlling the activation of the pump 2;

means 21 for controlling a debit of the flow of the liquefied gas which is dispensed. Such debit control means may comprise in particular a speed variator adapted for varying a rotation speed of the pump 2; and control input means (not represented) adapted for an operator of the refueling station to input commands for determining parameters of the liquefied gas delivery. Possibly, a control display may also be provided for monitoring values measured for at least some of these parameters, and/or gas storage parameters.

Obviously, one should understand that the above detailed description is provided only as an embodiment example of the invention. However secondary embodiment aspects may be adapted depending on the application, while maintaining at least some of the advantages cited.

The invention claimed is:

1. A system for dispensing a liquefied gas flow, said system comprising:

a vessel containing liquified gas;

a supporting structure having a suction end and a discharge end, and adapted for being fitted to the vessel so that the suction end is submerged in the liquefied gas within the vessel while the discharge end is located at an external surface of the vessel;

a pump positioned within the supporting structure between the suction end and the discharge end of the supporting structure, wherein said pump is affixed to and maintained by the supporting structure so as to be submerged in the liquefied gas when the system is in operation condition for dispensing the liquefied gas flow, and adapted for driving the liquefied gas flow from the suction end toward the discharge end;

a removable sealing assembly located at the discharge end of the supporting structure and adapted for sealing an aperture through a wall of the vessel when the system is in operation condition, wherein the sealing assembly is provided with a liquid outlet arranged for discharging the liquefied gas flow driven by the pump; and a conditioning system adapted for cooling or warming up at least one quantity of the liquefied gas, wherein the supporting structure and the sealing assembly are designed so that the pump can be moved within the vessel by means of said supporting structure when said pump is to be extracted from or introduced into said vessel, wherein the conditioning system and the supporting structure are adapted so that the conditioning system is affixed to the supporting structure and the conditioning system is maintained within the vessel by the supporting structure, in addition to the pump, between the suction end and the discharge end of the supporting structure, when the system is in operation condition, and wherein the supporting structure is further adapted so that the conditioning system can be also moved within the vessel by means of said supporting structure when said conditioning system is to be extracted from or introduced into said vessel.

2. The system according to claim 1, wherein the conditioning system is suitable for cooling or warming up the liquefied gas flow driven by the pump during travelling of said liquefied gas flow from the suction end (1a) to the discharge end of the supporting structure, when the system is in operation condition.

3. The system according to claim 1, wherein the conditioning system is suitable for cooling or warming up the liquefied gas contained in the vessel.

4. The system according to claim 1, wherein the system is arranged so that, when the system is in operation condition, the discharge end of the supporting structure is located higher than the suction end along a vertical direction along a vertical direction, and the supporting structure is further adapted for maintaining the conditioning system higher than the pump along the vertical direction.

5. The system according to claim 1, further comprising a peripheral wall extending from the suction end to the discharge end of the supporting structure, said peripheral wall surrounding both the pump and the conditioning system when the system is in operation condition.

6. The system according to claim 5, further comprising a pipe to be arranged within a volume internal to the peripheral wall for conducting the liquefied gas flow from the pump to the liquid outlet, and wherein the supporting structure has a height whereby a gas volume exists below the sealing assembly and surrounded by the peripheral wall, but the outside the pipe, when the system is in operation condition.

7. The system according to claim 6, wherein the height of the supporting structure is suitable so that the gas volume extends over a height of more than 0.20 meter along the vertical direction and when the system is in operation condition.

8. The system according to claim 5, further comprising a suction valve fitted to the peripheral wall at the suction end of the supporting structure, wherein said suction valve is adapted for being in open state when the system is in operation condition, so that the liquefied gas flow is admitted into a volume internal to the peripheral wall through the suction valve, and the suction valve is also adapted for being in closed state when the pump is not located, with respect to the peripheral wall, at a position corresponding to the system being in operation condition.

9. The system according to claim 8, wherein the suction valve is arranged so as to be driven into the open state by the pump being moved along the peripheral wall towards the suction end, and into the closed state by the pump being moved along said peripheral wall away from the suction end, respectively.

10. The system according to claim 1, wherein the vessel has a shape with a largest dimension along a horizontal direction or the vessel has a shape with a largest dimension along an oblique direction slanted between the horizontal direction and a vertical direction, or the vessel is underground.

11. The system according to claim 1, wherein the vessel is a sump container external to a liquefied gas storage tank, wherein said sump container connected said storage tank so that the sump container can be fed with liquefied gas from said storage tank.

12. The system according to claim 1, further comprising at least one gas handling component selected among
- an outlet valve connected to the liquid outlet for allowing, limiting or blocking the liquefied gas flow to be dispensed by the system,
- a check-valve connected to the liquid outlet, a flow-meter for measuring a debit of the liquefied gas flow dispensed by the system,
- at least one temperature sensor for measuring a temperature of at least one of the gas in liquid phase contained within the vessel and the liquefied gas flow dispensed by the system,
- at least one pressure sensor for measuring a pressure of at least one among the gas in liquid phase contained within the vessel and the liquefied gas flow dispensed by the system,
- a heat exchanger, and
- at least one release valve arranged for discharging gas from inside of at least one among the system and the vessel, wherein said gas handling component is arranged at the discharge end of the supporting structure or affixed to the sealing assembly when the system is in operation condition.

13. The system according to claim 1, further comprising electrical power supply means and control means arranged at the discharge end of the supporting structure or at the sealing assembly, and adapted for supplying electrical power to the pump and conditioning system when both the pump and conditioning system are maintained by the supporting structure and the system is in operation condition, and also adapted for controlling start and stop of the liquefied gas flow, and for adjusting a temperature and/or a pressure of the gas in liquid phase contained within the vessel and/or of the liquefied gas flow.

14. The system according to claim 13, wherein electrical supply means and the control means comprise at least one among control inputting means and a control display.

15. The system according to claim 1, wherein said liquefied gas is (a) methane, ethane, propane, butane, or blends thereof, or (b) helium, oxygen, nitrogen, ammonia, or space rocket or spacecraft propulsion liquid fuel.

16. A liquefied gas refueling station, comprising a liquefied gas dispenser and a system in accordance with claim 1, wherein the liquefied gas dispenser is connected to the liquid outlet (6) of the system.

17. The liquefied gas refueling station according to claim 16, wherein the liquefied gas is a motor fuel gas.

18. The liquefied gas refueling station according to claim 17, wherein said station is adapted for refueling road vehicles with motor fuel gas.

19. The system according to claim 6, wherein the height of the supporting structure is suitable so that the gas volume extends to greater than 0.20 meter and less than 1 meter along the vertical direction, when the system is in operation condition.

20. The system according to claim 1, wherein the vessel has a shape with a largest dimension along a vertical direction.

21. A system for dispensing liquefied gas from a vessel, said system comprising:
- a supporting structure for insertion into a vessel containing liquefied gas, said supporting structure having a suction end and a discharge end, wherein the suction end is designed to be submerged in liquefied gas;
- a pump positioned within the supporting structure between the suction end and the discharge end of the supporting structure, wherein said pump is affixed to and maintained by the supporting structure so as to be submerged in liquefied gas when in operation condition for dispensing liquefied gas, and said pump is adapted for driving liquefied gas from the suction end of the supporting structure toward the discharge end of the supporting structure;
- a removable sealing assembly located at the discharge end of the supporting structure and adapted for sealing an aperture through a wall of a vessel, wherein and the sealing assembly is provided with a liquid outlet arranged for discharging liquefied gas driven by the pump; and
- a conditioning system adapted for cooling or warming up at least one quantity of liquefied gas, wherein the supporting structure and the sealing assembly are designed to provide for extracting the pump from a vessel or for introducing the pump into a vessel, wherein the conditioning system and the supporting structure are adapted so that the conditioning system is affixed to the supporting structure and the conditioning system is maintained by the supporting structure at a point between the suction end and the discharge end of the supporting structure, and wherein the supporting structure is further adapted to provide for extracting the conditioning system from a vessel or for introducing the conditioning system into a vessel.

* * * * *